July 16, 1946.  L. E. HARPER  2,404,231
VARIABLE SPEED TRANSMISSION
Filed Aug. 26, 1943   2 Sheets-Sheet 2

INVENTOR
LYNDUS E. HARPER
BY Alfred R. Fuchs
ATTORNEY

Patented July 16, 1946

2,404,231

UNITED STATES PATENT OFFICE 2,404,231

VARIABLE-SPEED TRANSMISSION

Lyndus E. Harper, Kansas City, Mo., assignor to Omega Machine Company, Kansas City, Mo., a corporation of Missouri Application August 26, 1943, Serial No. 500,082

5 Claims. (Cl. 74—124)

My invention relates to variable speed drives, and more particularly to a variable speed transmission that is adjustable so as to have any desired output speed between a predetermined minimum and maximum.

My invention is particularly adapted for use as a speed reduction device in which the output speed is variable or adjustable between any desired predetermined minimum and maximum, being particularly adapted for use as a variable speed reduction device in which the driven shaft or output shaft is adapted to be operated at a very slow rate of speed relative to the driving shaft, and yet at the same time the speed be adjustable to obtain very slight differences in speed of the output or driven shaft, in spite of the fact that the same is operating at a very slow speed in any adjustment of said speed reduction device.

More particularly my invention comprises a variable speed drive or transmission means comprising cam and follower members, said cam members being of such a character that the throw of the cam varies so as to increase gradually from one end of said cam to the other end thereof in an axial direction, the cam and follower members being relatively adjustable so as to get any desired position of the follower on the cam to get the desired oscillating movement of the follower, to produce any desired amplitude of movement of the follower when acted upon by the cam within the limits of the throw of the cam from the position thereof of least throw to that of greatest throw. The cam members are, preferably, so made that the same taper or gradual increase in height from the one end thereof to the other end thereof to provide a cam portion at the one end of said cam that produces no movement or oscillation of the follower and one of the maximum amplitude desired at the other end thereof, the surface of the cam gradually rising from said one end of the cam to the other end thereof, so that the cam surface thereof is substantially of a conical character.

It is a particular purpose of my invention to provide, in a device of the above mentioned character, cam and follower means of such a character that the follower will cooperate with the cam to obtain the desired speed changing action of the device even though the cam surface is not machined, the character of the follower being such that machining or grinding of the cam is not necessary, the only finishing that is necessary being to remove the roughness from the surface of the cam members by sanding the same. This is due to the fact that the follower has a large area of contact with the cam. Furthermore, due to this large area of contact between the follower and cam, it is proposed to mold the cam members of plastic material, which makes it possible to reduce the friction between the cam and follower considerably below that which would otherwise exist.

The above referred to advantages of my invention exist because of the particular construction of the cam engaging member of the follower comprising a member having sliding contact with the surface of the cam, which may be referred to as a shoe carried by the follower, and which has a universally tiltable mounting on the follower so as to adjust itself properly in substantial parallelism with the surface of the cam member for any adjusted position thereof axially along the length of the cam.

One of the important advantages of my invention as a speed reducing device is that, by using my invention, the speed of the driven shaft can be varied to any desired extent and the movement thereof can be accurately controlled, so that it will start and stop with the starting and stopping of the driving shaft, if this is desired, this being accomplished by the worm gear driving means provided between the driving shaft and the variable speed means, and between the variable speed means and the driven shaft, thus preventing any over coasting of the driven shaft.

Other objects and advantages of my invention will appear as the description of the drawings proceeds. I desire to have it understood, however, that I do not intend to limit myself to the particular details shown or described, except as defined in the claims.

Figure 1:
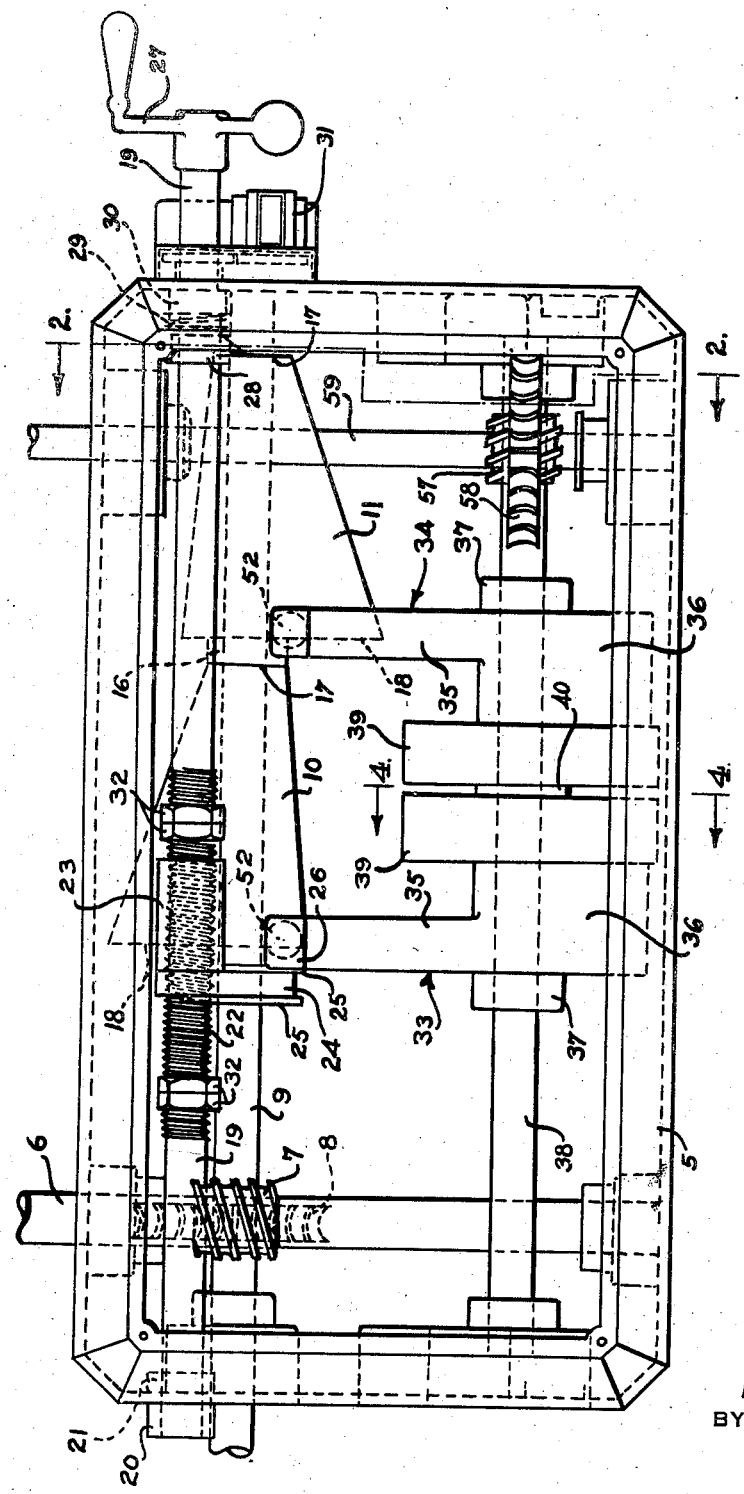
Fig. 1 is a top plan view of my improved variable speed transmission applied to a speed reduction device preventing over coasting.
Figure 2:
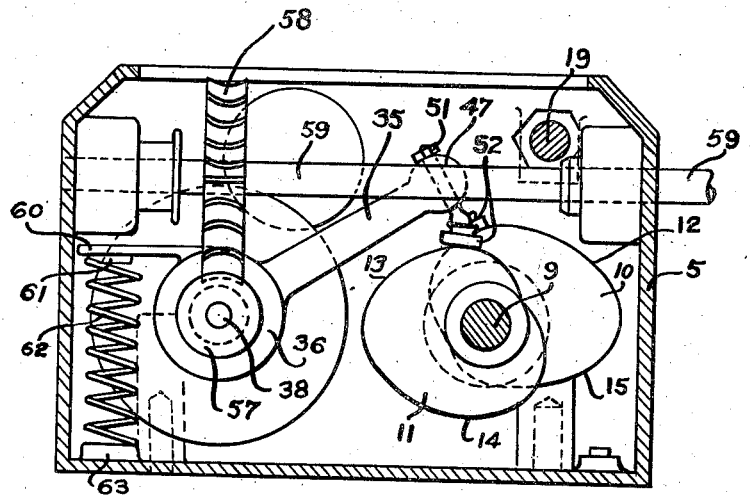
Fig. 2 is a section taken substantially on the line 2—2 of Fig. 1, certain parts being shown in elevation.

Referring in detail to the drawings, my improved variable speed transmission is shown in Fig. 1 as being applied to a speed reduction device, which is mounted in a frame or housing 5. A drive shaft 6 is mounted in suitable bearings in said housing and is provided with a worm 7 mounted thereon so as to rotate therewith. Said worm meshes with a worm wheel 8, which is fixed on the cam shaft 9, which is mounted in suitable bearings in said housing or frame 5. Mounted on said cam shaft 9 are the cam members 10 and 11. Said cam members are mounted on said shaft so as to rotate therewith, but are longitudinally slidable thereon, the particular driving connection between the shaft and the cams being of a well known character and not being shown in detail in the drawings. Said cam members 10 and 11 have a definite position relative to each other, both axially of the shaft and circumferentially of the shaft. Thus, if the shaft 9 rotates in a counter-clockwise direction, as shown in Fig. 2, the rising portion 12 of the cam 10 will be in such a position relative to the receding portion 13 of the cam 11, that the follower engaging the cam 11 will reach the rising portion 14 of the cam 11 before the follower engaging the cam 10 leaves the rising portion 12 thereof and passes to the receding portion 15 thereof. This will be obvious upon reference to Fig. 2. The purpose of this will be explained below.

While various means may be provided for holding the cam members in their relative axial and circumferential position, preferably, the same are made integral, a connecting portion 16 being provided joining the cam 10 to the cam 11.

As will be obvious from Fig. 1, each of the cams increases in height or throw from the small end 17 thereof to the large end 18 thereof, the cam surface being substantially a conical surface so that if a follower member is adjusted lengthwise or axially relative to the cam, so as to engage any desired portion along the length of the cam (by the length of the cam being meant the extent in a direction axially of the shaft 9), the throw or amplitude of movement of the follower member due to engagement with the cam will gradually increase as the position of the follower relative to the cam is varied from the small end 17 of the cam to the large end 18 thereof. In practice, in the particular form of the invention shown, the cams are actually adjusted lengthwise of the shaft 9, instead of the followers being adjusted, the followers having such a relative position to each other that the two followers will engage corresponding portions axially of the cams for any adjustment of the cam members.

The adjusting means comprises a screw-threaded rotatable shaft-like member 19 mounted in suitable bearings in the frame 5, but held against axial movement relative to the frame by means of suitable stop members, such as the collars 20 and 21. Said shaft-like member 19 is provided with a screw-threaded portion 22 with which a screw-threaded sleeve-like member 23 engages, said screw-threaded sleeve-like member 23 acting in a similar manner to a nut on said shaft, and having a laterally extending arm 24 thereon mounted in an annular groove between the flanges 25 on a rearward extension 26 on the cam member 10. It will be obvious that if the shaft 19 is rotated by means of the crank 27 the nut-like member 23 will be either moved to the right or left, as viewed in Fig. 1, dependent upon the direction of rotation of the crank member 27, thus moving the cam system made up of the cams 10 and 11 correspondingly to the right or left.

The shaft 19 is also provided with a collar 28, with which a coil spring 29 engages, said spring being mounted between said collar and a boss 30 projecting inwardly from the frame 5, and being under compression so as to frictionally hold the shaft 19 in adjusted position. Connected with the shaft 19 externally of the housing 5 is an indicating device 31, which may be in the form of an ordinary revolution counter, but which will indicate the position of the cams, as the same can be calibrated to indicate the position of the cams, or to indicate the speed of the output shaft for such position of the cams, or any other result produced by the rate of rotation of said shaft. Said shaft is further provided with stop members in the form of pairs of nuts 32 located on opposite sides of the sleeve-like member 23, the same not being shown in any operative position in Fig. 2, but spaced from the other parts so as to clearly show the same. The adjustment of the nuts 32 would, of course, be such as to limit the movement of the sleeve-like member 23 responsive to rotation of the crank 27 between desired limits, the extreme of which would be the axial length of the cam portions 10 and 11.

Cooperating with the cam members 10 and 11 are follower members 33 and 34, the follower member 33 engaging the cam 10 and the follower member 34 the cam 11. Said follower members are substantially the same in construction, each having an arm 35 extending from a hub-like body portion 36, said hub-like body portions being engaged by collars 37 secured to the shaft 38 to position the same on the shaft. Each of said followers is provided with a one-way roller clutch device 39, by means of which each of the same are connected with the shaft, and a spacing washer 40 is provided between said clutch devices 39.

Figure 4:
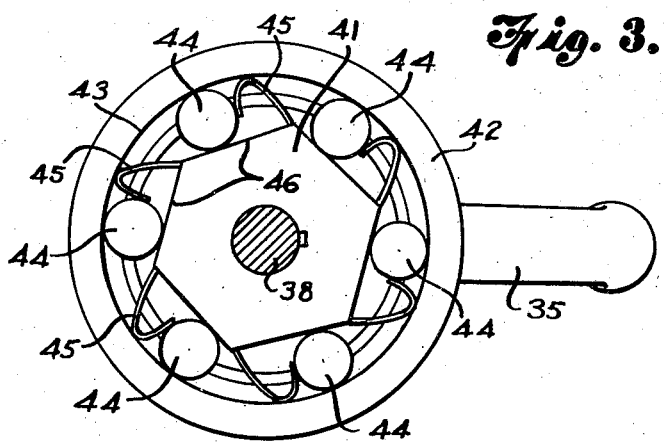
Fig. 4 is a section taken on the line 4—4 of Fig. 1 on a slightly enlarged scale.

While any desired type of clutch that is substantially instantaneous in operation can be provided, preferably, a roller clutch of the type shown in Fig. 4 is provided, the same comprising a polygonal member 41 keyed to the shaft 38, and an outer member 42 of a cylindrical character having an inner cylindrical surface 43 spaced from the polygonal periphery of the member 41 so as to provide a chamber of varying depth between said members 41 and 42 confining the rollers 44, the member 41 being, preferably, provided with springs 45 for urging the rollers toward one end of each of the flat faces 46 of the polygonal member 41.

It will be obvious that as the arm 35 is moved in a counter-clockwise direction in Fig. 4 relative to the shaft 38 by means of the cam 10 or 11, as the case may be, the rollers 44 will have a tendency to roll or slide on the flat faces 46 and be crowded between the narrowing passage formed between the cylindrical surface 43 and the plane surface 46, to thus grip the polygonal member 41 and cause said member 41 to be rotated with the member 42. As the springs 45 will hold the rollers 44 in a position closely adjacent that in which the same will act as gripping means between the members 42 and 41, this clutch action will be substantially instantaneous. However, when the arm 35 moves in the opposite direction the tendency for the members 44 will be to move in the opposite direction against the tension of the springs 45, slightly compressing said springs, but freeing the rollers 44 and disengaging said members 42 and 41 from each other so that the clutch device will operate in only one direction to always rotate the shaft 38 in the same direction. As the rising portions 12 and 14 of the cams 10 and 11 overlap circumferentially of the same, it will be obvious that when one follower is being swung in a direction to cause the arm 35 thereof to actuate the one-way clutch device 39 associated with that arm, the other follower will be moving in the opposite direction free of the shaft 38 until the rising portion of its cam is reached, whereupon it will also begin to rotate the shaft through its one-way clutch member 39, so as to give a continuous rotation to the shaft 38 in one direction.

Figure 3:
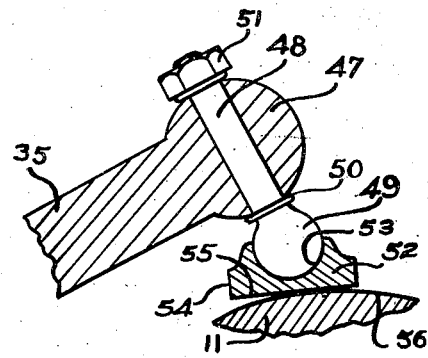
Fig. 3 is a fragmentary detail sectional view of the cam contacting shoe and associated parts.

Each of the arms 35 is provided with an enlargement 47 at the extremity thereof, through which a bolt-like member 48 extends, which is provided with a spherical head 49 and with an annular shoulder 50 engaging the enlargement 47 to clamp said member 48 in position when the nut 51 is tightened down on said member 48. The ball end or head 49 of the member 48 constitutes the ball member of a ball and socket joint, providing a universally tiltable connection between said arm and a head or shoe member 52, which has a socket portion 53 receiving the ball head 49. Said shoe member 52 is provided with an annular enlargement 54 presenting a substantially flat face 55 of large area to the surface 56 of a cam, such as the cam 11, of which a fragment is shown in Fig. 3. While the flat face 55 has substantially line contact with the curved surface 56 of the cam 11, and similarly with the cam 10, lengthwise or axially of the shaft 9, said shoe 52 has contact over a considerable distance with the conical surface of the cam, and as a result, any slight variations in the surface of the cam due to molding or casting thereof, will have no effect on the operation of the cam in oscillating the arm 35 by which the shoe or contact member 52 is carried.

In view of the provision of this sliding shoe member engaging the cam 11 and the cam 10, it is unnecessary to highly finish the cam surfaces, only a rough finishing operation being necessary on the surfaces of the cams, if the same are cast of metal, and no finishing thereof being necessary if the cams are molded of plastic material.

The shaft 38 is mounted in suitable bearings in the frame member 5 and has a worm 57 fixed thereto to rotate therewith, which meshes with a worm wheel 58 fixed on the shaft 59 to rotate therewith, said shaft 59 constituting the output or driven shaft of the device, the same being mounted in suitable bearings in the frame or housing 5.

Each of the follower members 33 and 34 are provided with a rearwardly extending arm or finger 60 on the body portion 36 thereof, which has a depending lug 61 receiving the compression coil spring 62, which is mounted in a suitable socket 63 in the bottom of the housing member 5, said spring 62 holding the shoe 52 of its follower member in engagement with the cam with which the same cooperates.

It will be obvious that the shaft 9 is driven at a reduced speed by the drive shaft 6 to rotate the cams 10 and 11, the cams 10 and 11 oscillating the arms 35 of the follower members 33 and 34 through arcs dependent upon the adjustment of said cam members 10 and 11 relative to said follower members. It will also be obvious that the arms 35 in their oscillating movements will operate the one-way clutch members to rotate the shaft 38, and that said shaft 38 will be rotated continuously, with an arrangement of cams such as described, the rate of rotation of the shaft 38 relative to the rate of rotation of the shaft 9 being dependent upon which part of the cam members 10 and 11 the followers engage, the same approaching zero as the followers approach the small ends 17 of the cam members 10 and 11 upon adjustment by means of the crank 27.

It will further be seen that due to the provision of the worm drive made up of the worm member 57 and the worm wheel 58, the shaft 59 constituting the output shaft of the variable speed transmission and variable speed reducer device will be rotated at a still much lower speed than the shaft 38. Thus there will be an initial speed reduction that is constant, due to the worm drive made up of the members 7 and 8, a variable speed reduction obtained by the members 10 and 11 and the followers cooperating therewith, and another fixed speed reduction due to the provision of the worm 57 and worm wheel 58. As a result, the shaft 59 can be operated at a very accurate adjusted speed, although its rate of rotation will be extremely slow as compared with the drive shaft 6, which makes possible very close adjustment of slowly operating apparatus, which must be accurately controlled. Also, due to the provision of the worm drives, any over-coasting of the driven apparatus operated by means of the shaft 59 is entirely prevented, and it will start and stop simultaneously with the starting and stopping of the drive shaft 6.

What I claim is:

1. A variable speed transmission comprising a cam shaft, means for rotating said cam shaft, a longitudinally tapering cam thereon gradually varying in throw axially of said shaft, a follower, and a shaft parallel to said cam shaft on which said follower is mounted, said follower comprising an arm mounted to swing about the axis of said follower shaft, and a cam engaging member mounted to swing universally on said arm and slidably engaging the convexly curved surface of said cam with a line contact.

2. A variable speed transmission comprising a cam shaft, means for rotating said cam shaft, a longitudinally tapering cam thereon gradually varying in throw axially of said shaft, a follower, and a shaft parallel to said cam shaft on which said follower is mounted, means for relatively adjusting said cam and follower axially of said cam, said follower comprising an arm mounted to swing about the axis of said follower shaft, and a cam engaging member mounted to tilt universally on said arm and having a wide flat face slidably engaging the convexly curved surface of said cam with a line contact.

3. A variable speed transmission comprising a cam shaft, means for rotating said cam shaft, a longitudinally tapering cam having a convexly curved cam surface thereon gradually varying in throw axially of said shaft, a follower, and a shaft parallel to said cam shaft on which said follower is mounted, said follower comprising an arm mounted to swing about the axis of said follower shaft, and a shoe universally tiltably mounted on said arm and having a flat face slidably engaging said convexly curved face of said cam with a line contact.

4. A variable speed transmission comprising a cam shaft, means for rotating said cam shaft, a longitudinally tapering cam having a convexly curved cam surface thereon gradually varying in throw axially of said shaft, a follower, and a shaft parallel to said cam shaft on which said follower is mounted, means for relatively adjusting said cam and follower axially of said cam, said follower comprising an arm mounted to swing about the axis of said follower shaft, a member fixed on said arm and depending therefrom, said member and said arm extending perpendicularly to said shafts and at an angle to each other, and a shoe universally tiltably mounted on said member and having a flat face slidably engaging said convexly curved face of said cam with a line contact.

5. A variable speed transmission comprising a cam shaft, means for rotating said cam shaft, a longitudinally tapering cam having a convexly curved cam surface thereon gradually varying in throw axially of said shaft, a follower, and a shaft parallel to said cam shaft on which said follower is mounted, means for relatively adjusting said cam and follower axially of said cam, said follower comprising a hub rotatable about the axis of said follower shaft, an arm rigid therewith, a finger on said hub, a ball ended member mounted on said arm, said ball ended member and said arm extending perpendicularly to said shafts and at an angle to each other, a shoe universally tiltably mounted on the ball end of said member having a flat face slidably engaging said convexly curved face of said cam, and resilient means engaging said finger to hold said flat face in line contact with said cam.

LYNDUS E. HARPER.